US009440633B2

(12) United States Patent
Switzer et al.

(10) Patent No.: US 9,440,633 B2
(45) Date of Patent: Sep. 13, 2016

(54) ELECTRONIC STROKE SENSOR FOR AIR DISC BRAKE WITH INSPECTION PORT

(71) Applicant: Indian Head Industries, Inc., Charlotte, NC (US)

(72) Inventors: Jeff Douglas Switzer, Charlotte, NC (US); Steve Lepard, Concord, NC (US); Mark David Chandler, Bloomfield, NY (US)

(73) Assignee: INDIAN HEAD INDUSTRIES, INC., Charlotte, NC (US)

( * ) Notice: Subject to any disclaimer, the term of this patent is extended or adjusted under 35 U.S.C. 154(b) by 0 days.

(21) Appl. No.: 14/546,577

(22) Filed: Nov. 18, 2014

(65) Prior Publication Data

US 2015/0068851 A1    Mar. 12, 2015

Related U.S. Application Data

(63) Continuation-in-part of application No. 14/054,049, filed on Oct. 15, 2013.

(60) Provisional application No. 61/356,325, filed on Jun. 18, 2010.

(51) Int. Cl.
| | | |
|---|---|---|
| F16D 66/00 | (2006.01) | |
| B60T 17/22 | (2006.01) | |
| B60T 13/40 | (2006.01) | |
| F16D 65/28 | (2006.01) | |
| B60T 17/08 | (2006.01) | |
| G01M 11/08 | (2006.01) | |
| F16D 121/02 | (2012.01) | |
| F16D 125/58 | (2012.01) | |

(52) U.S. Cl.
CPC .............. *B60T 17/221* (2013.01); *B60T 13/40* (2013.01); *B60T 17/081* (2013.01); *F16D 65/28* (2013.01); *F16D 66/00* (2013.01); *G01M 11/081* (2013.01); *F16D 2066/003* (2013.01); *F16D 2121/02* (2013.01); *F16D 2125/582* (2013.01)

(58) Field of Classification Search
CPC ....... F16D 66/00; B60T 17/221; B60T 17/22
USPC ...... 188/1.11 R, 1.11 W, 1.11 E, 71.7, 196 R
See application file for complete search history.

(56) References Cited

U.S. PATENT DOCUMENTS 2,142,190 A * 1/1939 Hewitt ................... B60T 17/081
                                                           55/512
2,873,436 A * 2/1959 Avrea ...................... B60T 17/22
                                                           200/83 R (Continued)

*Primary Examiner* — Robert A Siconolfi
*Assistant Examiner* — Mahbubur Rashid
(74) *Attorney, Agent, or Firm* — Warner Norcross & Judd LLP

(57) ABSTRACT

A brake actuator assembly for an air disk brake includes an actuator housing having a pushrod that is extensible from the actuator housing. A lever arm is disposed inside a caliper housing. The lever arm is actuated by the pushrod for transferring motion from the actuator to a brake pad. A sensor element is disposed between the actuator housing and the caliper housing with the sensor element being sealably engaged to the actuator housing providing an air tight enclosure between the caliper housing and the actuator. An inspection port is disposed in the sensor element providing access to receive a visual sensor and a pressure sensor for identifying a condition of the brake actuator and for identifying a condition of the air tight enclosure.

15 Claims, 9 Drawing Sheets

Fig-2

(56) References Cited

U.S. PATENT DOCUMENTS

| | | | |
|---|---|---|---|
| 5,713,238 A * | 2/1998 | Pierce | B60T 17/083 73/121 |
| 6,352,137 B1 * | 3/2002 | Stegall | F16D 65/28 188/1.11 E |
| 6,755,233 B2 * | 6/2004 | Fisher | B60T 17/081 164/112 |
| 7,014,016 B2 * | 3/2006 | Morris | F16D 66/00 188/1.11 E |
| 2002/0126007 A1 * | 9/2002 | Weant | B60Q 1/44 340/479 |

* cited by examiner

ELECTRONIC STROKE SENSOR FOR AIR DISC BRAKE WITH INSPECTION PORT

RELATED APPLICATIONS

This application claims priority to U.S. patent application Ser. No. 14/054,049 filed on Oct. 15, 2013; which claims priority to U.S. Provisional Patent Application No. 61/356,325 filed on Jun. 18, 2010.

BACKGROUND

The present invention is related to an electronic stroke monitor for a vehicle brake. More specifically, the present invention is related to an electronic stroke monitor of an air disc brake for use on a heavy duty truck.

The number of miles traveled by heavy-duty trucks and passenger busses increases significantly every year. Because the size of passenger cars being driven has become smaller due to the increased price of gasoline, it has become increasingly necessary to ensure the proper performance of brake actuators and brake systems of these heavy-duty vehicles to provide the truck operator every opportunity to avoid a loss of control. Therefore, various systems have been developed to monitor the stroke of a brake actuator for use on drum brakes widely used in industrial trucking.

However, on heavy-duty passenger vehicles, such as, for example, busses, the use of air disc brakes is becoming more popular. To date, a viable brake monitoring system for use on an air disk brake has not been developed.

Brake monitoring systems used on air drum brakes are directed toward monitoring the length of stroke of a pushrod projecting from inside a chamber of the brake actuator. The monitoring enables the user to determine if the brake actuator is functioning properly, is subject to an over-stroke condition, or is subject to a hanging or dragging brake condition. Monitoring these conditions by monitoring the stroke of the pushrod is possible because the pushrod of the brake actuator is fixedly attached to the actuation device of the drum brake. In the case of a hanging or dragging brake, the actuation device of the drum brake is immobilized in an actuated position preventing the pushrod from returning to an un-actuated position when the brake pedal is released by the vehicle operator.

However, the pushrod of an air disk brake actuator is not fixedly attached to the lever arm of a caliper that actuates the disk brake. Therefore, should a hanging or dragging brake condition occur, the lever arm becomes separated from the pushrod rendering the type of monitoring system used on a drum brake non-functional for a disk brake. An electronic sensor that monitors the stroke of the pushrod senses that the pushrod has returned to its un-actuated position and incorrectly senses that the brake is operating normally. Furthermore, it is impossible to verify function of the actuator or the caliper without separating the two devises to perform a manual inspection. Still further, it is impossible to determine if the two devices remain pneumatically sealed where necessary to prevent entry of environmental contamination from causing the caliper from functioning properly. Therefore, it has become necessary to develop a vehicle brake monitoring assembly that is capable of identifying and distinguishing between an over-stroke condition and a hanging brake condition of an air disk brake.

Additionally, the caliper housing is sealed to a boot disposed inside the brake actuator to prevent environmental contamination from entering the caliper, which is known to cause mechanical defects to the components disposed inside the caliper resulting in brake failure. Presently, a determination of the integrity of the air-tight-seal between the caliper housing and the brake actuator is impossible. Therefore, it would be desirable to provide the ability to determine if the integrity of the air-tight-seal has been maintained or remains uncompromised.

SUMMARY

A vehicle brake monitor assembly for an air disk brake includes a brake actuator having a pushrod projecting from inside a chamber of the brake actuator. The pushrod releasably actuates a lever arm of the caliper moving the disk brake into braking position when the pushrod is disposed in an extended position and releases the disk brake from the braking position when the pushrod is disposed in a retracted position. The pushrod includes a pushrod shaft and a contact member biased in a telescoping relationship relative to the pushrod shaft. The lever arm of the caliper abuts the contact member and counteracts the bias of the contact member preventing the contact member from telescoping from the pushrod shaft. A sensor is integrated with the assembly proximate the contact member. The sensor detects movement of the pushrod relative to the lever arm and the pushrod shaft.

The sensor that is positioned proximate the contact member detects differences in transmission along a length of the contact member that enables the determination of the condition of the brake actuator. For example, the sensor detects when the brake is operating in a normal condition, is subject to a dragging brake condition, is subject to an over stroke condition, or subject to an out of adjustment condition. As set forth above, prior attempts to monitor all these conditions on an air disk brake have proven futile. In particular, prior monitoring devices have been unable to identify a hanging brake condition due to separation between the pushrod and a lever arm of the air disk brake. This separation results when the lever arm is immobilized in an actuated position when a vehicle operator releases a brake pedal causing the pushrod to retract into the brake actuator. The telescoping design of the present invention allows the sensor to detect when the lever arm is immobilized in an actuated position.

An inspection port is disposed in the sensor element and provides access for a visual sensor and a pressure sensor for identifying a condition of the brake actuator and for identifying a condition of the air tight enclosure. The sensor port now, in conjunction with the sensor, enables the full analysis of the disposition of an air disk braking system. The sensor port provides the ability to visually inspect the caliper without entirely disassembling the air disk braking system. Furthermore, for the first time, the integrity of the air tight enclosure is ascertainable, which provides and advance warning of a mechanical failure as a result of environmental contamination entering the air tight enclosure.

A further benefit of the present inventive assembly is its use with a conventional brake caliper without modification to the caliper. Prior attempts to monitor air disk brake systems require modifying the brake caliper in an attempt to determine if the lever arm is immobilized in an actuated position. By providing a sensor element proximate the pushrod of the actuator, the inventive assembly has eliminated the need to modify the caliper of an air disk brake system, to detect a dragging brake condition.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION

Figure 1:
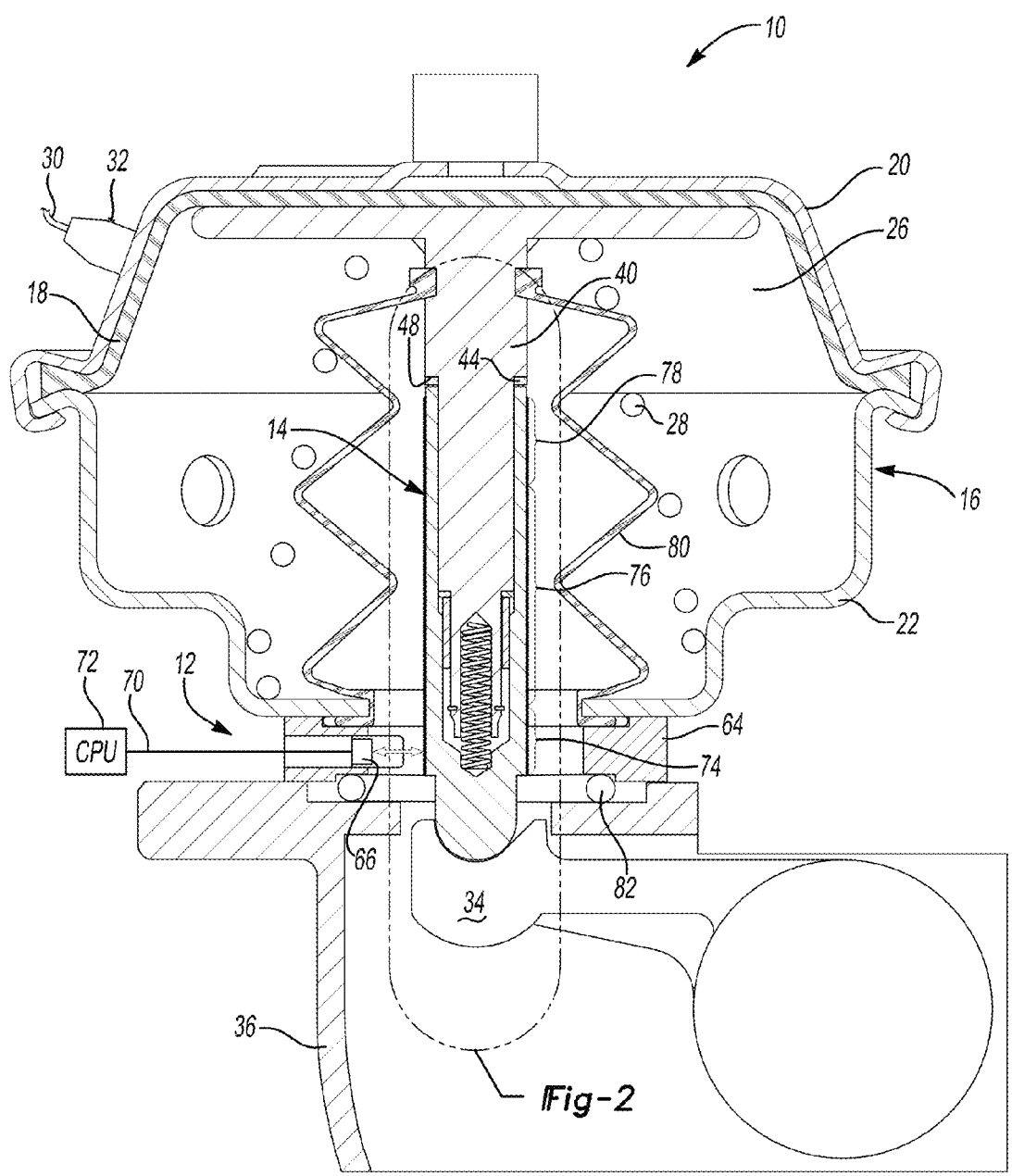
FIG. 1 shows a side sectional view of the brake monitoring assembly of the present invention.

A brake actuator is shown generally at 10 in FIG. 1. The brake actuator 10 includes a brake monitor assembly 12 for determining if the brake actuator is functioning in a normal condition or a fault condition as will be explained further hereinbelow. The brake actuator 10 includes a pushrod 14 disposed inside a service chamber 16. It should be understood by those skilled in the art that the service chamber 16 can also be used in cooperation with a secondary chamber or power spring chamber (not shown), and various other brake activator configurations, as might be necessary for a given vehicle braking system.

The service chamber 16 includes a diaphragm 18 that is secured between an upper housing member 20 and a lower housing member 22. Therefore, the service chamber 16 is separated by the diaphragm 18 into a pressure side 24 (best seen in FIG. 4) and a return side 26 which houses a return spring 28. Pressurized air enters the pressure side 24 of the service chamber 16 through air pressure port 30, the pressure of which is monitored by pressure sensor 32. Although the pressure sensor 32 is shown proximate the service chamber 16, it is contemplated by the inventors that the pressure sensor 32 is located at the treadle valve (brake pedal) of the vehicle. It should be understood to those of ordinary skill in the art that each embodiment also includes a separate pressure sensor (not shown) located at the brake pedal to identify pressure being applied by the vehicle operator to the brake pedal. When the operator actuates the brake pedal, pressurized air passes through the air pressure port 30 forcing the diaphragm 18 against the pushrod 14 causing the pushrod 14 to extend outwardly from the service chamber 16 in a known manner.

When the vehicle operator depresses the brake pedal, as set forth above, air pressure enters the pressure side 24 of the service chamber 16 through the air pressure port 30 forcing the pushrod 14 outwardly from the service chamber. A lever arm 34 disposed inside a caliper 36 is pivoted by the pushrod 14, when extending outwardly, causing the brakes (not shown) of the vehicle to actuate in a known manner. When the vehicle operator removes pressure from the brake pad, air is vented from the pressure side 24 of the service chamber 16 and the return spring 28 forces the pushrod 14 inwardly of the service chamber 16 allowing the lever arm 34 to return to its unactuated position. It should be understood by those of skill in the art, that the caliper 36 described above functions in a normal manner.

Figure 2A:
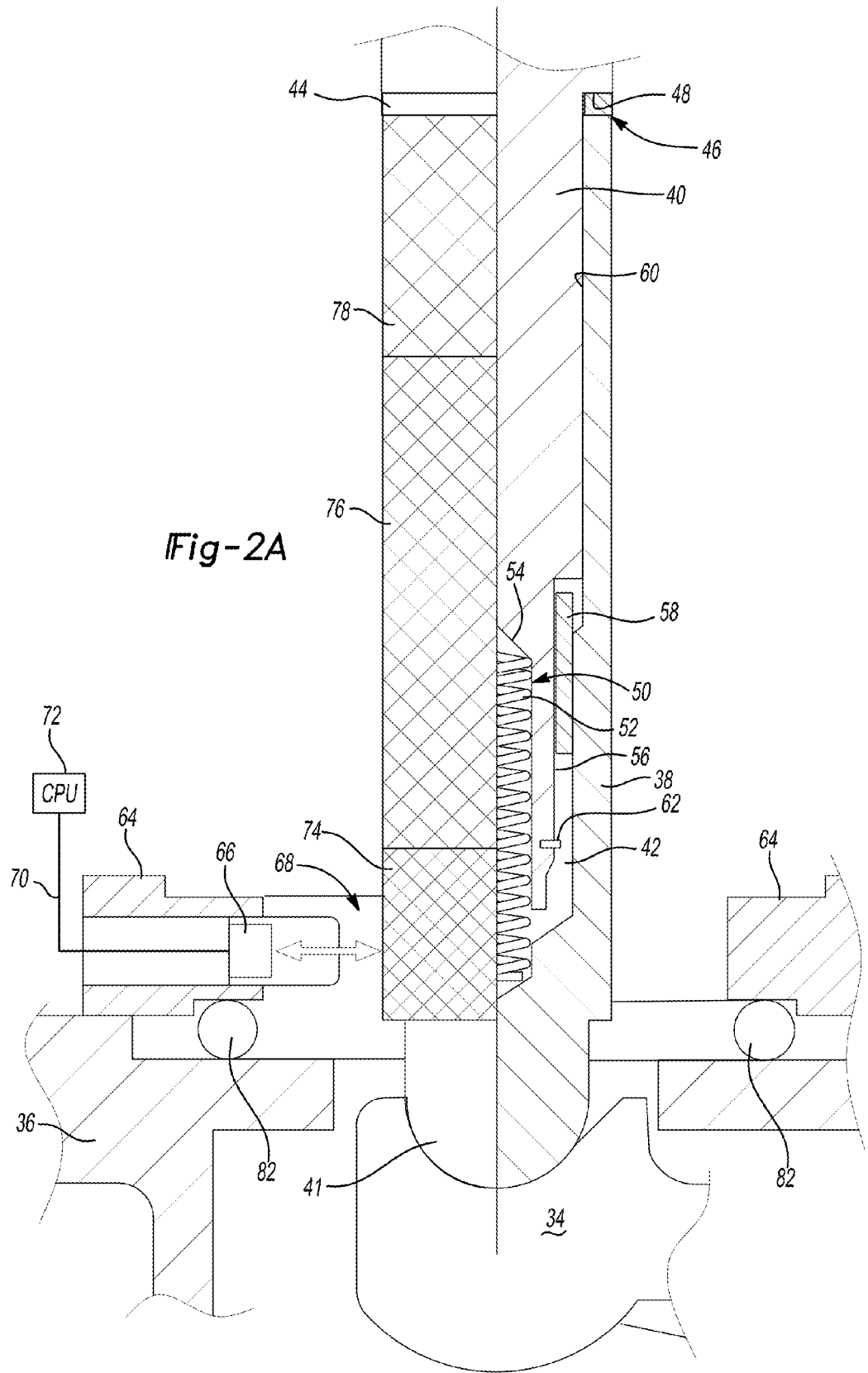
FIG. 2a shows a first embodiment of the pushrod of the present invention.

Referring now to FIG. 2A, the pushrod 14 includes a contact member 38 that circumscribes a pushrod shaft 40. The contact member 38 defines a terminal end 41 that abuts the lever arm 34 of the caliper 36. The pushrod shaft 40 is received in a tubular opening 42 defined by the contact member 38. An adjustment shim 44 is disposed at a base 46 of the tubular opening 42 and is sandwiched between a shaft stop 48 of the pushrod shaft 40 and the base 46. The adjustment shim 44 is provided in a plurality of thicknesses from which the length of the pushrod 14 is adjusted to provide dimensional accuracy between terminal end 41 of contact member 38 and lever arm 34 as will become more evident below.

The pushrod shaft 40 defines an elongated opening 50, which receives a biasing member 52 shown here in the form of a spring. The biasing member 52 is compressed between a floor 53 and a terminal wall 54 of the elongated opening 50. Therefore, the biasing member 52 provides a biasing force that telescopes the contact member 38 from the pushrod shaft 40, effectively lengthening the pushrod 14.

Figure 3:
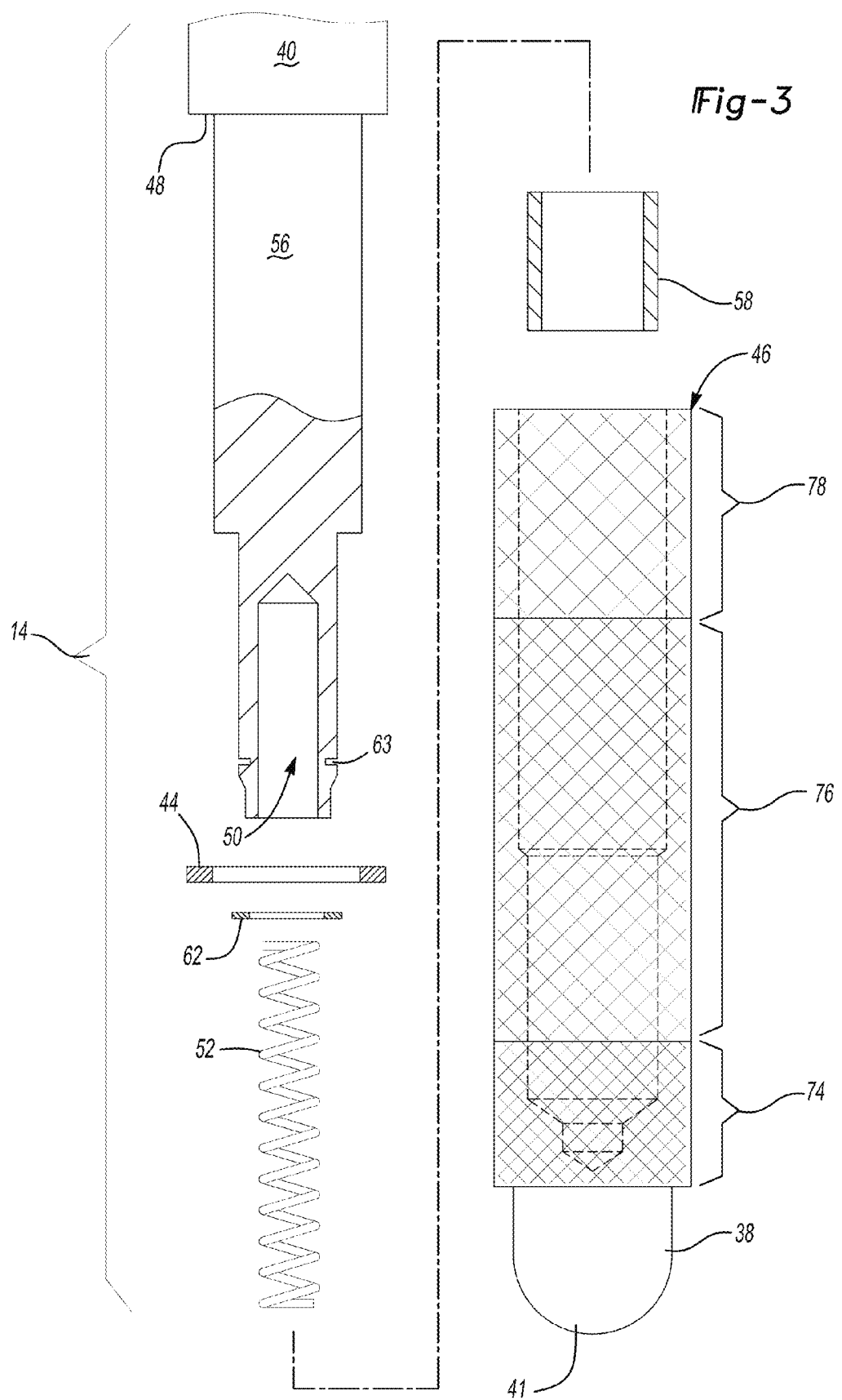
FIG. 3 shows an expanded view of the pushrod of the present invention.

The pushrod shaft 40 defines a circumscribing groove 56 into which a retaining member 58 that is fixedly attached to an inner wall 60 of the tubular member 42 is received. The retaining member 58 slides in an axial direction defined by the pushrod shaft 40 within an expanse of the groove 56. A stop 62 prevents the biasing member 52 from separating the contact member 38 from the pushrod shaft 40 when abutted by the retaining member 58. The stop 62 takes the form of a spring clip or equivalent received by a notch 63 (FIG. 3) in the pushrod shaft 40.

A sensor element 64 is sandwiched between the service chamber 16 and the caliper 36. A sensor 66 is disposed inside the sensor element 64 and is provided sensing access to the contact member 38, which is received through an opening 68 in the sensor element 64. The sensor 66 communicates through communication line 70 with a controller or central processing unit 72. The sensor 66 is contemplated by the inventors to take the form an optical sensor, a magnetic sensor, a mechanical sensor, or a radio frequency enhanced sensor. For clarity, however, the following description will describe an optical sensor, further contemplated to be an infrared sensor. The exemplary embodiment makes use of an Optek infrared optical OPB733TR sensor capable of both transmitting an infrared signal and receiving a reflected infrared input. However, it should be understood by those of skill in the art, that any of the sensors explained above are operable. As best represented in FIG. 2a, the contact member 38 defines a non-reflective surface 74, a semi-reflective surface 76, and a fully reflective surface 78.

As best seen in FIG. 1, a sealing boot 80 seals to the pushrod shaft 40 at an upper end and to the sensor element 64 at an opposite end. Therefore, the contact member 38, and the non-reflective, semi-reflective, and fully reflective surfaces 74, 76, 78 are protected from environmental contamination that is known to enter the service chamber 16. A secondary seal 82 seals the sensor element 64 to the caliper 36, which is fully enclosed to protect the lever arm 34 from environmental contamination. Therefore, the contact member 38 and the sensor 66 are completely protected from the environment, preventing the optical sensor 66 and the reflective surfaces 74, 76, 78 from becoming fouled.

Figure 2B:
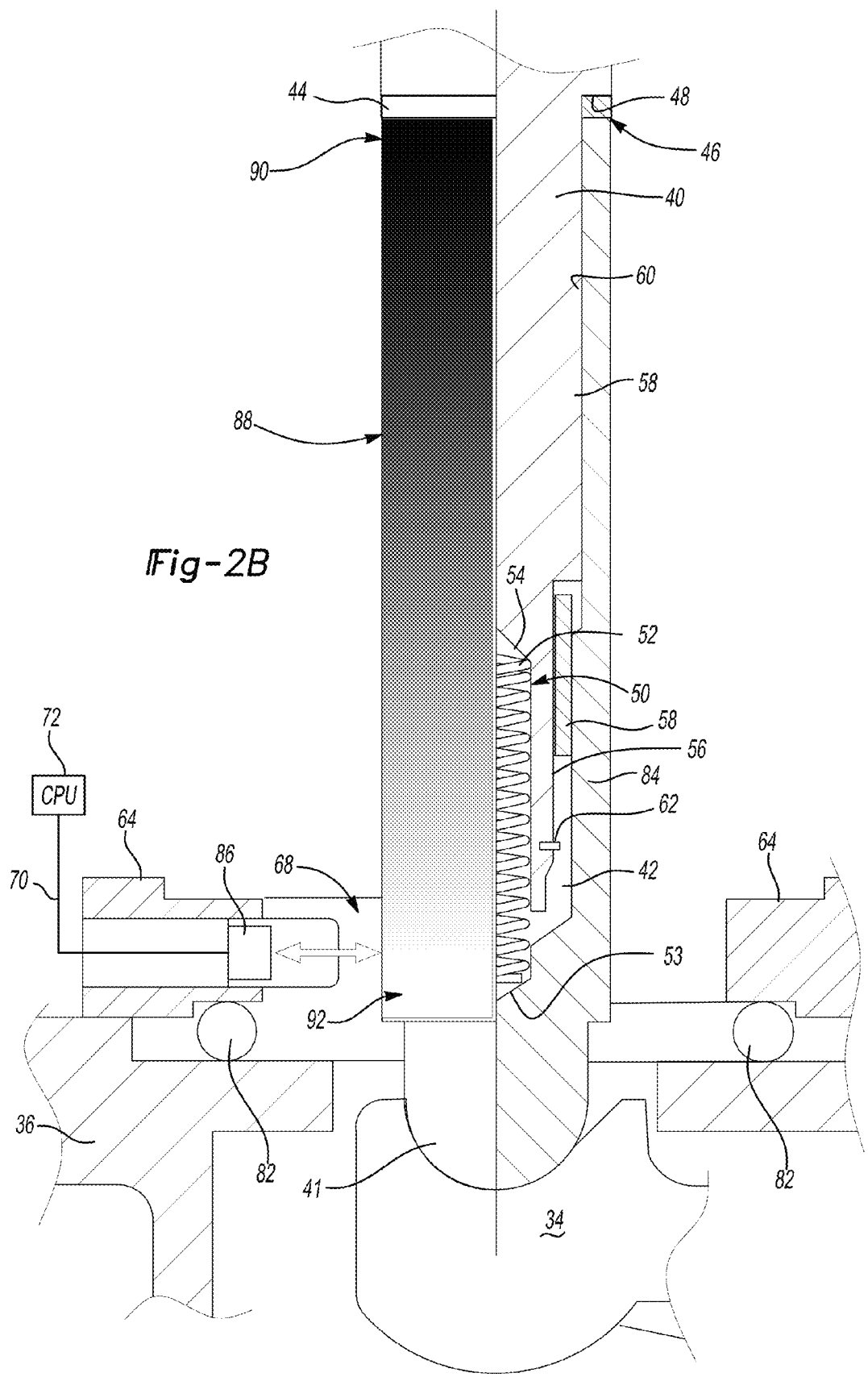
FIG. 2b shows an alternative embodiment of the pushrod of the present invention.

An alternative embodiment is shown in FIG. 2b where common elements have the same numbers as those elements disclosed in FIG. 2a. The alternative embodiment makes use of an alternative contact member 84 and a linear sensor 86. The alternative contact member 84 includes an alternative reflective coating 88 that has a variable reflective surface. A first end 90 of the contact member is more reflective than a second end 92 of the contact member with a gradual transition in between. The sensor detects the variation in the amount of reflectivity to determine the location of the alternative contact member 84, and therefore the lever arm 34 as will become more evident in the description below.

The sequence of brake monitoring will now be described. It is contemplated by the inventors that the sensor 66 takes the form of an infrared sensor that transmits an infrared signal toward the contact member 38 which has varying degrees of reflectivity as described above to reflect the infrared signal back toward the sensor 66, which in turn signals the controller 72 the degree of reflectivity via communication lines 70. It should be understood to those of skill in the art that other optical sensors may be used, including photoelectric digital lasers, ordinary lasers, and equivalents.

During normal operation, when the brake is released (shown in FIG. 1), the optical sensor transmits a light signal toward the non-reflective surface 74 of the contact member 38 receiving no reflective signal from the contact member 38. The brake application pressure, as indicated by the pressure sensor 32, is less than or equal to about 2 psi. Therefore, no active fault is signaled to the vehicle operator.

Figure 4:
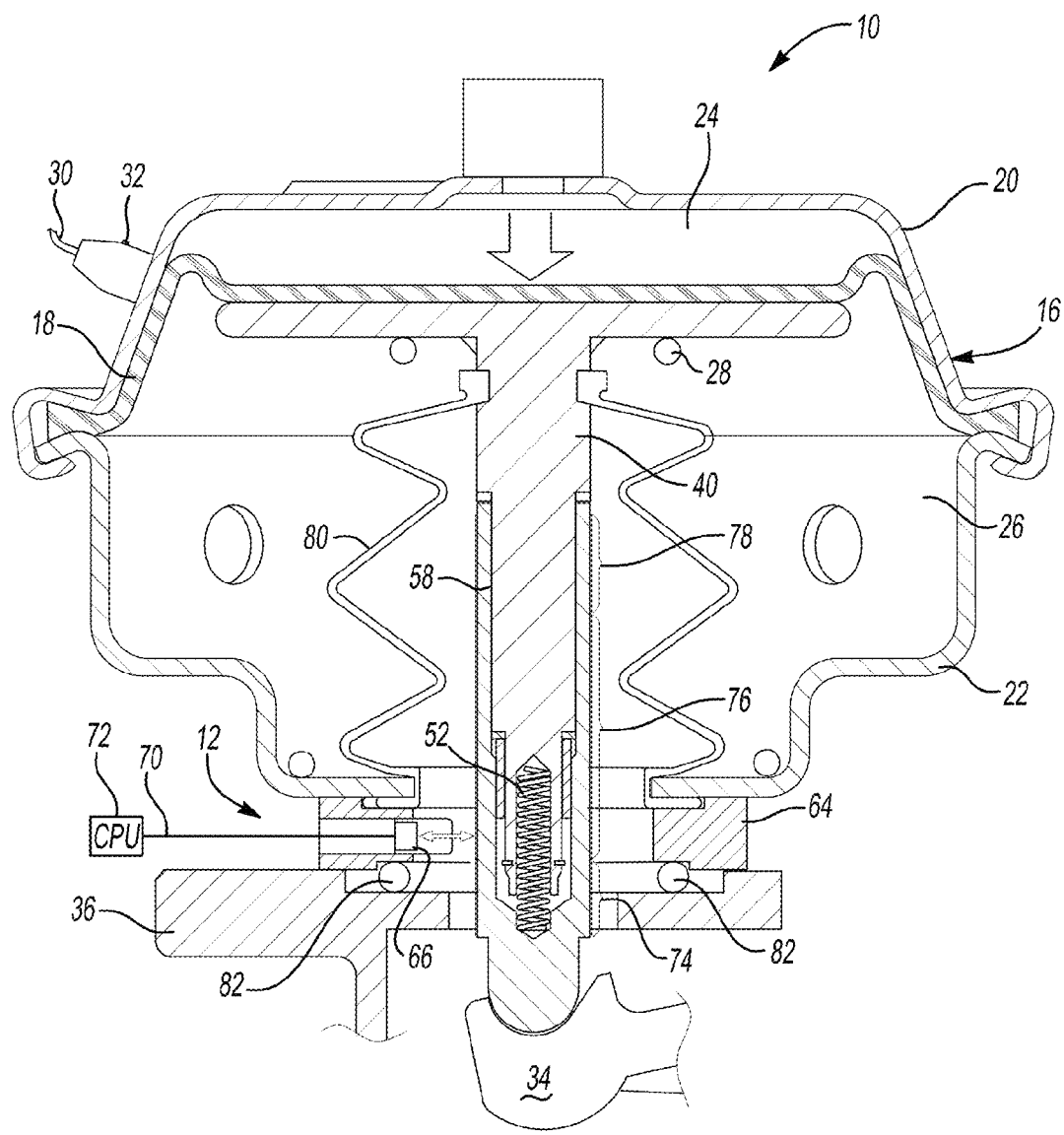
FIG. 4 shows the brake actuator in an extended position in a normal operating condition.

Referring now to FIG. 4, pressure is applied to the brake pedal by the operator causing air to fill the pressure side 24 of the service chamber 16 to actuate the lever arm 34. Because the pushrod 14 is forced outwardly from the service chamber 16 by the diaphragm 18, the sensor 66 is positioned proximate the semi-reflective surface 76 of the contact member 38. The pressure sensor 32 signals air pressure of greater than or equal to about 2 psi indicating normal operation of the brake actuator 10 so long as the sensor 66 detects reflectivity from the semi-reflective surface 76. It is contemplated by the inventors that the semi-reflective surface 76 reflects about thirty percent of the light transmitted from the sensor 66. It should be noted that the biasing member 52 remains fully compressed because the lever arm 34 counteracts the biasing force of the biasing member 52 during normal, activated condition.

Figure 5:
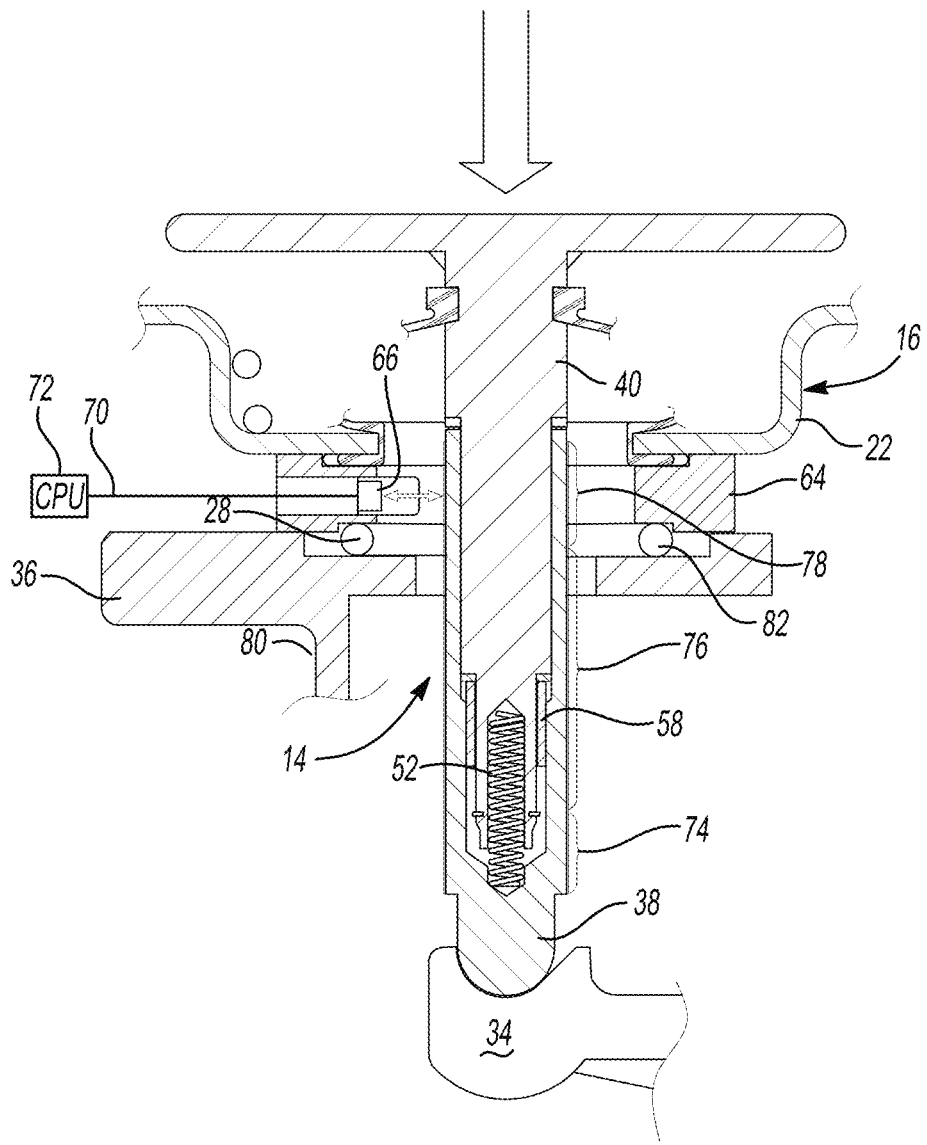
FIG. 5 shows a partial sectional view of the brake actuator in an over stroke condition.

FIG. 5 shows an overstroke condition causing the controller 72 to signal the operator that a fault condition exists. In the overstroke condition, the pushrod 14 extends outwardly of the service chamber 16 beyond normal extension length so that the sensor 66 transmits light to the fully reflective surface 78 and detects a full reflectivity. The brake pressure, as detected by the pressure sensor 32, is greater than or equal to about 2 psi. Therefore, the sensor 66 signals the controller 72 full reflectivity with normal application pressure causing the controller to signal an over stroke condition to the operator.

Figure 6:
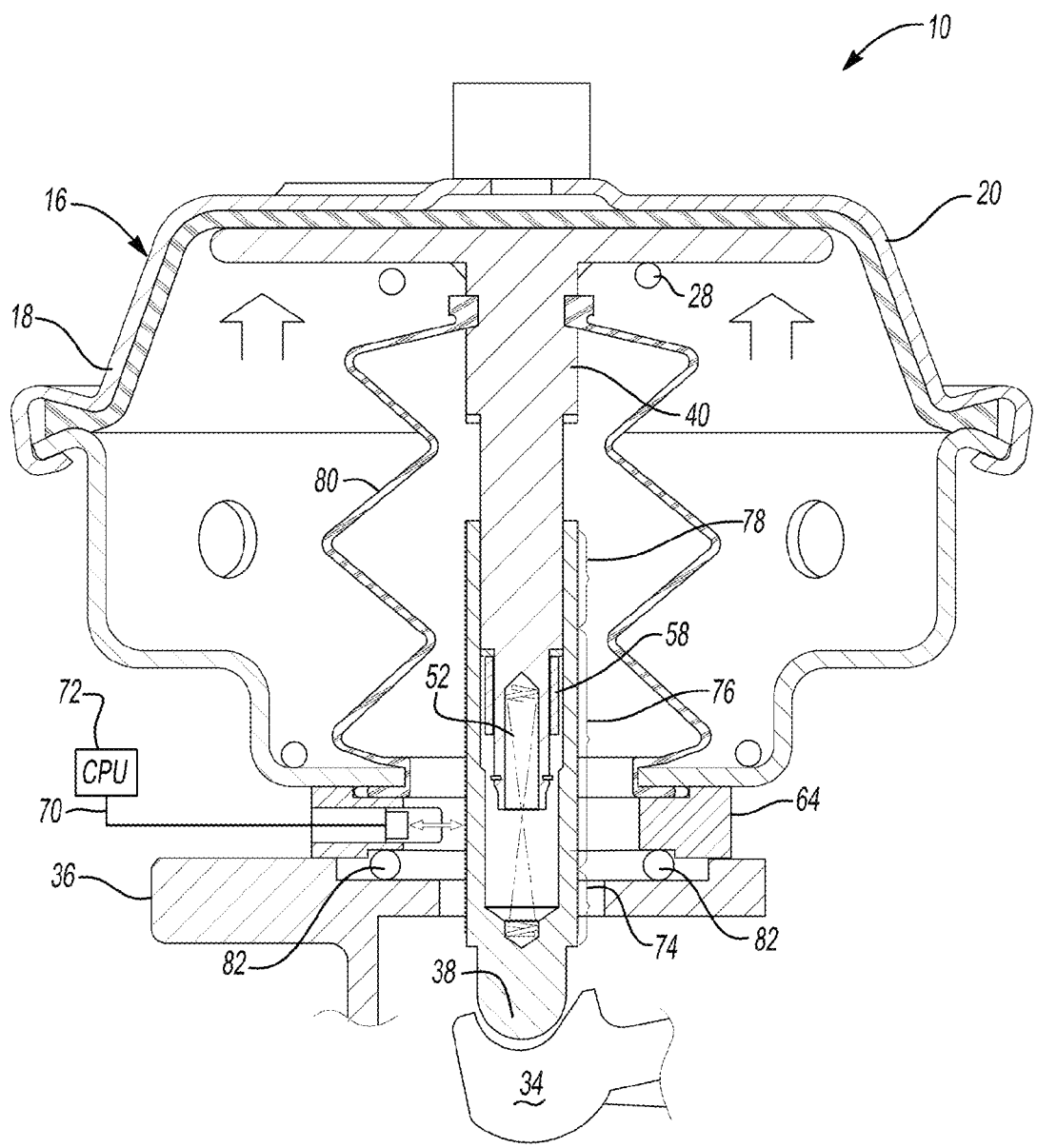
FIG. 6 shows the brake actuator of the present invention having a hanging or dragging brake condition.

FIG. 6 represents a dragging brake condition. The dragging brake condition is identified by the controller 72 both when the vehicle is moving at road speed and when the vehicle is not moving at road speed. In the dragging brake condition, air pressure has been released from the pressure side 24 of the service chamber 16 causing the return spring 28 to retract the pushrod 14 into the service chamber 16. However, because the brake is now subject to a dragging condition, the lever arm 34 is retained in the actuated position causing separation with the contact member 38. Because the lever arm 34 is no longer counteracting the biasing force of the biasing member, the biasing member 52 causes the contact member 38 to telescope from the pushrod shaft 40. Therefore, the sensor 66 now transmits light toward the semi-reflective surface 76 of the contact member 38 as opposed to transmitting light toward the non-reflective surface 74 as is typical of a normally functioning brake. Because the pressurized air has been vented from the pressure side 24 of the service chamber 16, the brake application pressure now reads less than or equal to about 2 psi. The combination of the semi-reflective surface 76 being detected by the sensor 66 and the low air pressure of less than or equal to about 2 psi causes the controller 72 to indicate a dragging or hanging brake condition.

A further fault condition is indicated when the sensor 66 detects the non-reflective surface 74 when the brake pedal is depressed by the operator causing an air pressure reading of greater than or equal to about 12 psi. In this instance, the controller signals a non-functioning actuator condition to the operator.

Figure 7:
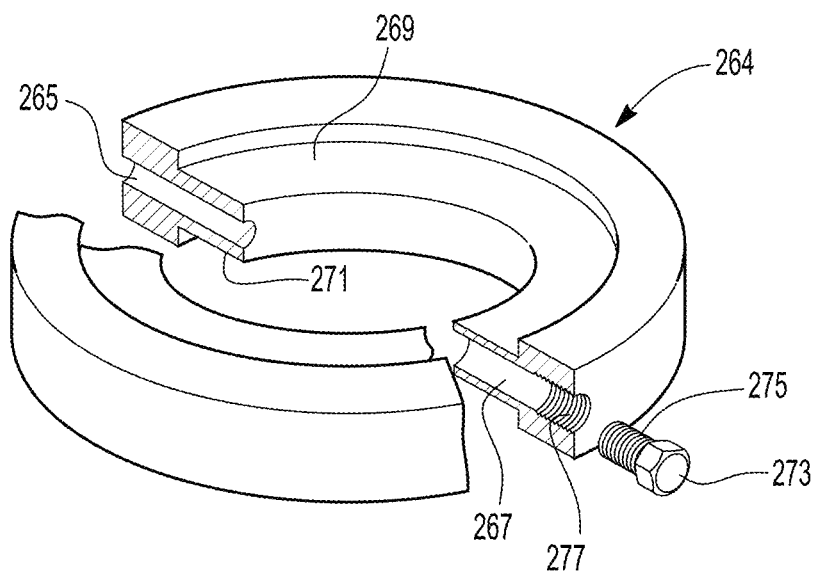
FIG. 7 shows a perspective view of an alternative embodiment of the sensor element of the present invention.
Figure 8:
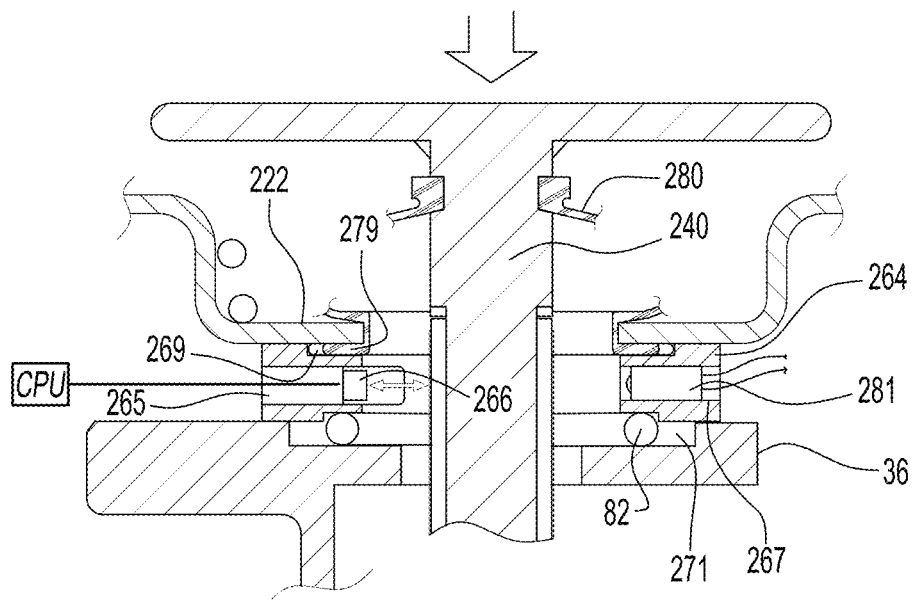
FIG. 8 shows a cross sectional view of the present assembly showing the alternative embodiment of the sensor element having a vision sensor.
Figure 9:
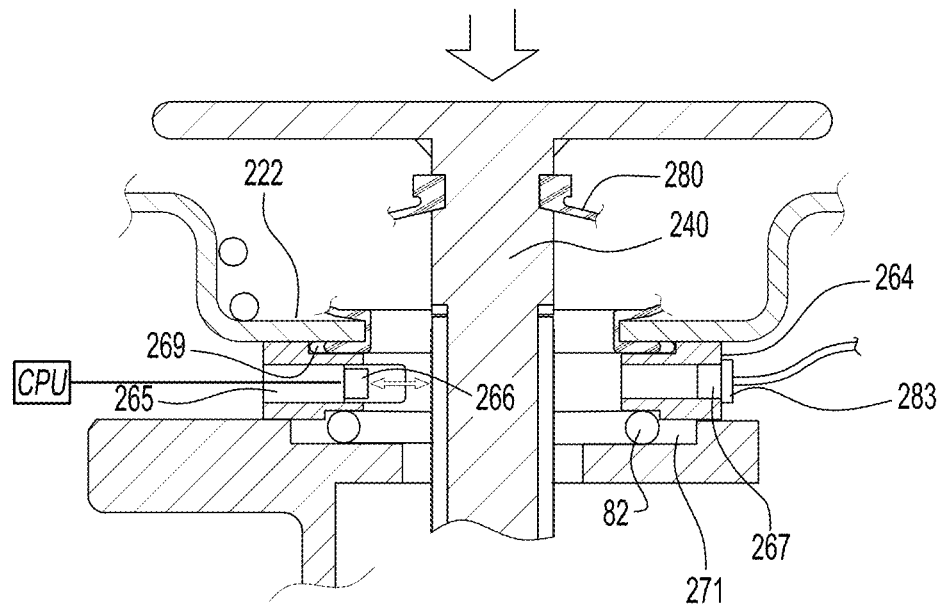
FIG. 9 shows a cross sectional view of the present assembly showing the alternative embodiment of the sensor element having a pressure sensor.

FIGS. 7-9 show an alternative embodiment of the present invention generally at 210 wherein like elements include the same element number as the prior embodiment, but in the 200 series. An alternative sensor element is shown at 264 of FIG. 7. The sensor element includes an opening 265 for a sensor 266 (see FIG. 8) and an inspection port 267. The sensor element 264 includes an actuator seal groove 269 and caliper seal groove 271. A plug 273 includes threads 275 and is received by a threaded portion 277 of the inspection port 267 to seal the inspection port 267 the purpose of which will be explained further below.

Referring now to FIG. 8, a flange 279 of sealing boot 280 is sandwiched between the lower housing member 222 and the sensor element 264 within the actuator seal groove 269. A seal 82 is disposed between the sensor element 264 and the caliper 36 within the caliper seal groove 271. As set forth above, the sealing boot 280 is sealed to the pushrod 240 creating an air tight enclosure 37 (FIG. 1) with the caliper 36. A visual sensor 281 is received in inspection port 267 for performing a visual inspection inside the air tight enclosure 37 without having to separate the brake actuator 10 from the caliper 36. The visual sensor 281 takes the form of a camera or light sensor. The visual sensor 281 may also be extended into the caliper 36 through the inspection port 267 for examining the caliper 36 for defects. The visual sensor may also be extended into the sealing boot 280 to examine the integrity of the sealing boot 280. Still further the visual sensor 281 is contemplated to sense changes in reflectivity from the indicia or reflective surfaces 74, 76, 78 disposed upon the pushrod 240 to calibrate or otherwise evaluate the monitoring accuracy of sensor 266 by way of reading comparison.

A further embodiment is generally shown in FIG. 9 at 210 where a pressure sensor 283 is inserted into the inspection port 267. The pressure sensor 283 is used to determine if the air tight enclosure 37 (best shown in FIG. 1) is, in fact, air tight. As set forth above, the air tight enclosure extends between the brake actuator, as defined by the sealing boot 80 to the caliper 36 by way of the sensor element 66, 266. A loss of integrity of the air tight enclosure 37 will, over time, allow environmental contamination to adversely affect the performance of the caliper 36 and cause false reading or non-readings by the sensor 66, 266.

While the visual inspection may show the actuator 10 and the caliper 36 are functioning properly, it cannot verify the air tight enclosure 37 remains properly sealed to prevent environmental contamination from entering the caliper 36 causing the caliper 36 to fail. Furthermore, environmental contamination will cover the sensor 266 or the reflective material 74, 76, 78 preventing an accurate determination of the condition of the actuator 10. Therefore, the pressure sensor 283 determines if there is a pressure loss by way of drawing a vacuum or pulsing positive pressure into the air tight enclosure 37 and sensing variance. A variation in the pressuring reading made by the pressure sensor 283 provides an indication that the integrity of the air tight enclosure 37 has been compromised. It is likely that a loss in function will occur from buildup of environmental contamination.

Figure 10:
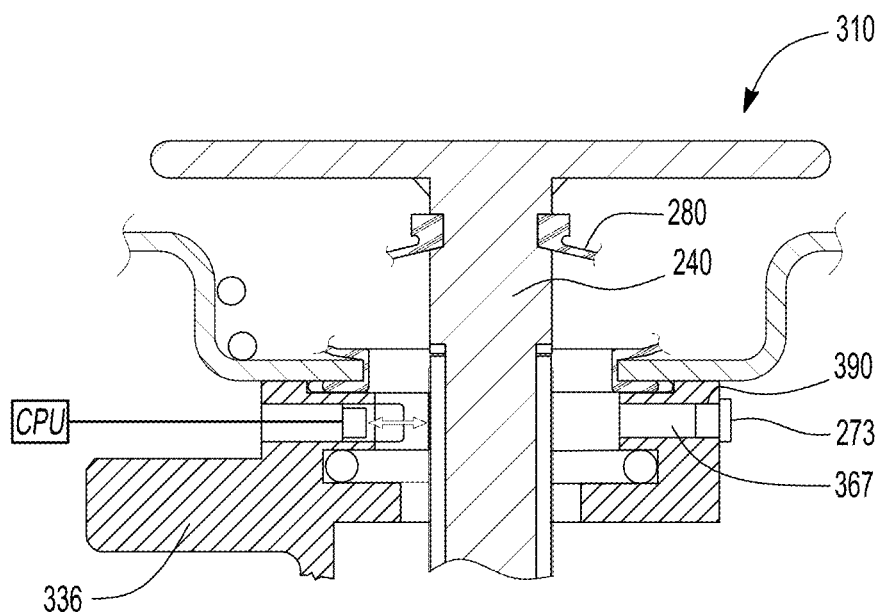
FIG. 10 shows a still further embodiment wherein the sensor element is integral with the caliper housing.

FIG. 10 shows a still further embodiment of the assembly generally at 310. In this embodiment, an alternate caliper housing 336 includes an alternate inspection port 367. The alternate caliper housing 336 includes an extended portion 390 in which the alternate inspection port 367 is defined. The plug 273 of the prior embodiment seals the alternate inspection port 367 while the assembly 310 is in service. The alternate inspection port 367 receives the visual sensor 281 (FIG. 8) and the pressure sensor 283 (FIG. 9) in the same manner as set forth above. In this way, the extended portion 390 of the caliper housing 336 functions in the same way as the sensor element 264 of the prior embodiment.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, the invention may be practiced otherwise than is specifically described.

What is claimed is:

1. A brake actuator assembly for an air disk brake sued used for braking a vehicle, said brake actuator assembly comprising:
   an actuator housing enclosing a pushrod being extendable outwardly from said actuator housing and a caliper housing having a lever arm disposed therein, said lever arm being actuated by said pushrod for transferring motion from said actuator to the air disk brake;
   a sensor element disposed between said actuator housing and said caliper housing with said sensor element being sealably engaged to said actuator housing providing an air tight enclosure between said caliper housing and said actuator; and
   a sealable inspection port disposed in said sensor element and being configured to receive an optical sensor comprising a camera and a pressure sensor for identifying a condition of said brake actuator and for identifying a condition of said air tight enclosure.

2. The assembly set forth in claim 1, wherein said air tight enclosure includes a sealing boot sealing a said pushrod disposed in said actuator housing to said sensor element.

3. The assembly set forth in claim 1, wherein said sealing boot includes a flange disposed between actuator housing and said sensor element thereby sealing said sensor element to said actuator housing.

4. The assembly set forth in claim 1, wherein said pushrod includes indicia for identifying a length of extension of said pushrod from said actuator housing and said inspection port provides visible access to said indicia.

5. The assembly set forth in claim 1, wherein said inspection port provides visible access inside said caliper housing for identifying a condition of said lever arm disposed inside said caliper housing upon insertion of said optical sensor.

6. The assembly set forth in claim 1, wherein said sensor element is conjoined with said caliper.

7. The assembly set forth in claim 1, wherein said sensor element includes a light sensor and said pushrod includes indicia, said light sensor sensing disposition of said indicia for identify a condition of said brake actuator.

8. The assembly set forth in claim 1, wherein said sensor element defines an actuator seal groove for receiving said sealing boot for sealing said sensor element to said caliper housing and a caliper seal groove for receiving a seal for sealing said sensor element to said caliper.

9. The assembly set forth in claim 1, wherein said optical sensor and said pressure sensor are releasably received by said inspection port disposed in said sensor element.

10. The assembly set forth in claim 1, wherein said port defined by said sensor element comprises opposing openings, each receiving either said optical sensor or said pressure sensor.

11. A brake assembly for braking a vehicle, comprising: a brake actuator being interactive with a caliper, said brake actuator including a pushrod telescoping into engagement with a lever arm disposed inside said caliper, said brake actuator and said caliper providing an air tight chamber therebetween;
   a sealable inspection port disposed at said caliper providing access to said pushrod of said brake actuator and said lever arm of said caliper for identifying a condition of said actuator and said caliper including identifying if said air tight enclosure is pneumatically sealed;
   wherein said inspection port is configured to receive an optical sensor comprising a camera for viewing inside said air tight enclosure without disassembling said brake actuator and said caliper.

12. The brake assembly set forth in claim 11, wherein said inspection port is position at said caliper to provide access to said pushrod and said piston of said brake actuator and to said lever arm of said caliper.

13. The brake assembly set forth in claim 11, wherein said inspection port sealably engages a pressure sensor for determining if said air tight enclosure is pneumatically sealed.

14. The brake assembly set forth in claim 11, wherein said inspection port is defined by a housing of said caliper.

15. The brake assembly set forth in claim 11, wherein said sealable inspection port is positioned for providing visual access to an interaction between said lever arm and said pushrod for identifying if said lever arm is in contact with said pushrod.

* * * * *